Sheet 1.
2 Sheets.

J. E. Emerson.
Attaching Handles to Cross-cut Saws.
Nº 71594      Patented Dec. 3, 1867.

Witnesses.

Inventor.
J. E. Emerson,
By atty— A. V. B. Stoughton

J. E. Emerson.
Attaching Handles to Cross-cut Saws.
Nº 71594    Patented Dec. 3, 1867.

Witnesses.

Inventor.
J. E. Emerson,
By atty. A.V.B.Stoughton

UNITED STATES PATENT OFFICE.

J. E. EMERSON, OF TRENTON, NEW JERSEY.

IMPROVEMENT IN MODE OF ATTACHING HANDLES TO CROSS-CUT SAWS.

Specification forming part of Letters Patent No. 71,594, dated December 3, 1867.

*To all whom it may concern:*

Be it known that I, J. E. EMERSON, of Trenton, in the county of Mercer and State of New Jersey, have invented certain new and useful Improvements in an Attachable and Detachable Handle for Saws; and I do hereby declare the following to be a full, clear, and exact description of the same, reference being had to the accompanying drawings, making a part of this specification, in which—

Figure 1:
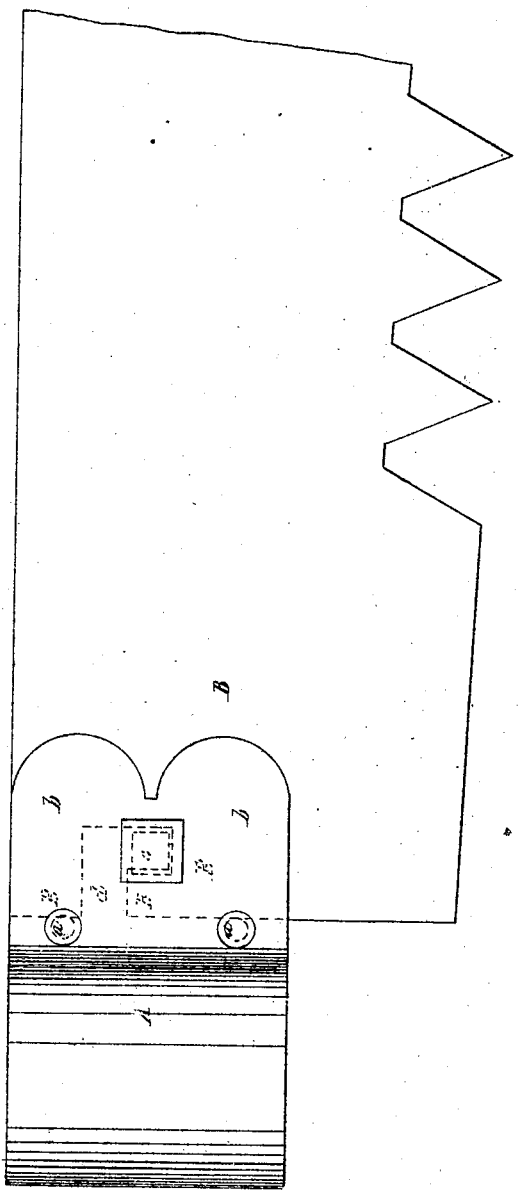
Figure 1:
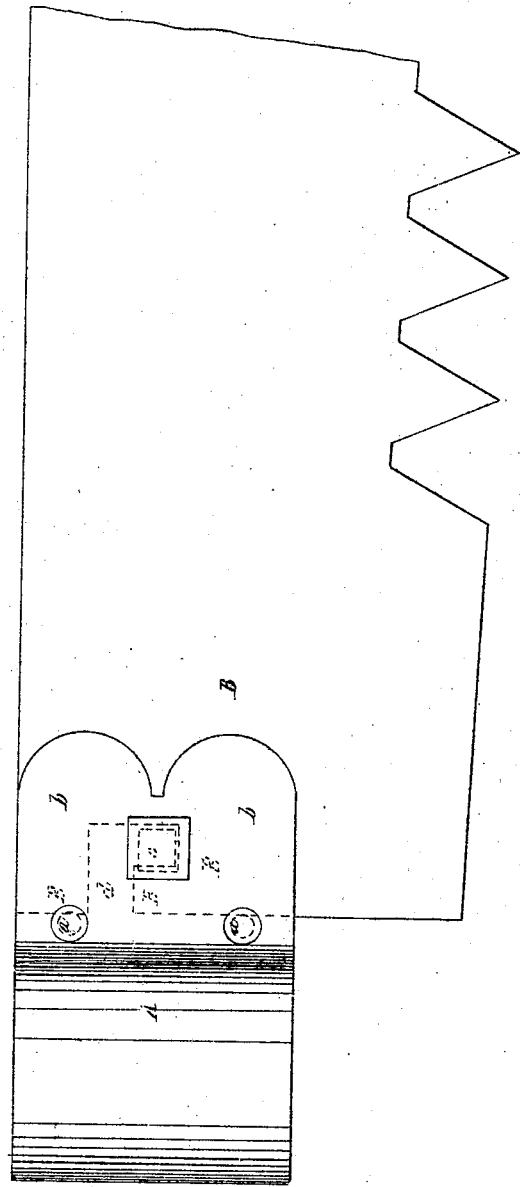

Figure 1 represents a side view of a portion of a saw with the socket which contains the handle. Fig. 2 represents a horizontal section through the same; and Fig. 3 represents a modified form of slot in the saw for straddling the bolt.

Similar letters of reference, where they occur in the separate drawings, denote like parts in all of the figures.

The advantages of having the handle or handles of a saw removable and replaceable are obvious—as, for instance, the placing of it in clamps for filing, or for removing it from a kerf that has closed at the top; but to make the handles or saw removable and replaceable, under their varied uses, the means must be so simple and efficient as to admit of its being done without liability to disarrangement, and particularly without the use of tools, which are liable to be lost or mislaid.

My invention consists in a fastening composed of a slot in the saw-plate, and a slot in the handle-socket, and a wedge-bolt, or its equivalent, that both clamps the saw laterally and forces and holds it in a longitudinal direction in the slot in the socket.

To enable others skilled in the art to make and use my invention, I will proceed to describe the same with reference to the drawings.

The socket A, which I prefer to make, is fastened together near the handle with two or more rivets, *a a*, leaving the parts *b* beyond the rivets open, so as to admit the end of the saw B. Through the projecting portions *b* there is made an opening that will receive a wedge-shaped bolt, *c*, and near the end of the saw, and at such distance from the end as to fit closely between the rivets *a a* and the wedge-shaped bolt *c*, I cut or form a slot, *d*, that will pass over the bolt *c*.

When the saw, or rather its end, is inserted in the socket, then, by turning the thumb-nut *e*, the wedge-shaped bolt is drawn against the saw, as seen in Fig. 2, and it jams the saw tight up against the rivets *a a*, and at the same time closes or clamps the parts *b* tight up against the sides of the saw, thus giving the saw three bearings in the socket, and more may be given, if necessary.

To remove the handle from the saw it is not necessary to remove the wedge-shaped bolt, but simply to give the thumb-nut about one turn, and back the bolt slightly, and then the slot in the saw admits of their separation. I have shown two forms of slots, *d*, one straight and cut in from the back of the saw, the other right-angled and cut in from the end.

Instead of making the socket of plate-iron and riveting it, it may be made of malleable cast-iron, and, when so made, the slot into which the saw slips, should be cast or wrought into it, and in this case the back of the slot would form the support for the end of the saw, as the rivets do in the wrought or plate iron socket. The wedge-shaped bolt, too, instead of moving or acting by its longitudinal movement, may be made so that by turning it around would bear against the saw, and force it endwise into or against its end bearing, whether that end bearing be the rivets or the back of the slot.

I have shown my invention as applied to cross-cut saws, but can use the same kind of fastening on other saws, so as to remove the handle or the device that holds the handle from the saw, and as readily attach it again.

In the plate or wrought sockets, instead of the rivets alone for the end of the saw to bring up and rest against, a plate of the proper thickness may be riveted in the slot, which would give more bearing-surface to the end of the saw.

Having thus fully described my invention, what I claim therein as new, is—

The use of a wedge-shaped or wedging bolt, for securing a removable and replaceable handle to a saw, so that it will not only hold laterally, but force the saw endwise against a bearing to give it an end support, substantially as described.

J. E. EMERSON.

Witnesses:
  A. B. STOUGHTON,
  EDM. F. BROWN.